United States Patent
Sanderlin

(10) Patent No.: US 10,931,821 B2
(45) Date of Patent: *Feb. 23, 2021

(54) CALL DATA MANAGEMENT PLATFORM

(71) Applicant: Capital One Services, LLC, McLean, VA (US)

(72) Inventor: Kevin Sanderlin, Elizabeth City, NC (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/441,594

(22) Filed: Jun. 14, 2019

(65) Prior Publication Data

US 2020/0128131 A1    Apr. 23, 2020

Related U.S. Application Data

(63) Continuation of application No. 16/163,199, filed on Oct. 17, 2018, now Pat. No. 10,362,169.

(51) Int. Cl.
*H04M 3/51*    (2006.01)

(52) U.S. Cl.
CPC ....... *H04M 3/5166* (2013.01); *H04M 3/5158* (2013.01); *H04M 3/5191* (2013.01); *H04M 2203/6072* (2013.01)

(58) Field of Classification Search
CPC .......... H04M 3/5158; H04M 3/5166; H04M 3/5191; H04M 2203/6072
USPC ....... 379/67.1–88.28, 201.01, 265.01–266.1, 379/93.03, 93.12, 201.11, 210.02–210.03; 370/351–357; 709/201–207, 217–248
See application file for complete search history.

(56) References Cited

U.S. PATENT DOCUMENTS

| | | | |
|---|---|---|---|
| 6,122,624 A | 9/2000 | Tetro et al. | |
| 6,341,724 B2 | 1/2002 | Campisano | |
| 6,904,143 B1* | 6/2005 | Peterson | H04M 3/2218 379/265.01 |
| 7,480,631 B1* | 1/2009 | Merced | G06Q 20/3674 235/380 |
| 7,657,005 B2* | 2/2010 | Chang | H04M 3/5183 370/352 |
| 8,666,841 B1 | 3/2014 | Claridge et al. | |
| 8,666,894 B1 | 3/2014 | Buch et al. | |
| 10,034,174 B1 | 7/2018 | Tuomikoski et al. | |

(Continued)

OTHER PUBLICATIONS

Co-pending U.S. Appl. No. 16/163,199, filed Oct. 17, 2018.

*Primary Examiner* — Hemant S Patel
(74) *Attorney, Agent, or Firm* — Harrity & Harrity, LLP

(57) ABSTRACT

A device may receive voice call data indicating that a voice call has been initiated between a first device and an interactive voice response device. The device may obtain, based on the voice call data, a user account identifier identifying a user account and obtain, based on the user account identifier, user account data including user authentication data. The device may receive user input provided by the first device during the voice call and determine, based on the user authentication data, that the user input fails to authenticate a user associated with the user account. The device may receive data indicating that the voice call has terminated and identify, based on the user input failing to authenticate the user, a second device. The device may perform an action based on the second device and the voice call data.

20 Claims, 7 Drawing Sheets

(56) References Cited

U.S. PATENT DOCUMENTS

| | | | |
|---|---|---|---|
| 10,362,169 B1* | 7/2019 | Sanderlin | H04M 3/5158 |
| 10,674,011 B1* | 6/2020 | Ouimette | H04M 3/42195 |
| 2004/0078340 A1 | 4/2004 | Evans | |
| 2007/0204033 A1* | 8/2007 | Bookbinder | G06Q 10/10 |
| | | | 709/224 |
| 2009/0260064 A1* | 10/2009 | McDowell | G06F 21/10 |
| | | | 726/4 |
| 2012/0047072 A1 | 2/2012 | Larkin et al. | |
| 2012/0109802 A1 | 5/2012 | Griffin et al. | |
| 2013/0159446 A1 | 6/2013 | Carlson et al. | |
| 2013/0291099 A1 | 10/2013 | Donfried et al. | |
| 2014/0258009 A1 | 9/2014 | Alshobaki et al. | |
| 2014/0337243 A1 | 11/2014 | Dutt et al. | |
| 2015/0073987 A1 | 3/2015 | Dutt et al. | |
| 2015/0254764 A1 | 9/2015 | Segura et al. | |

\* cited by examiner

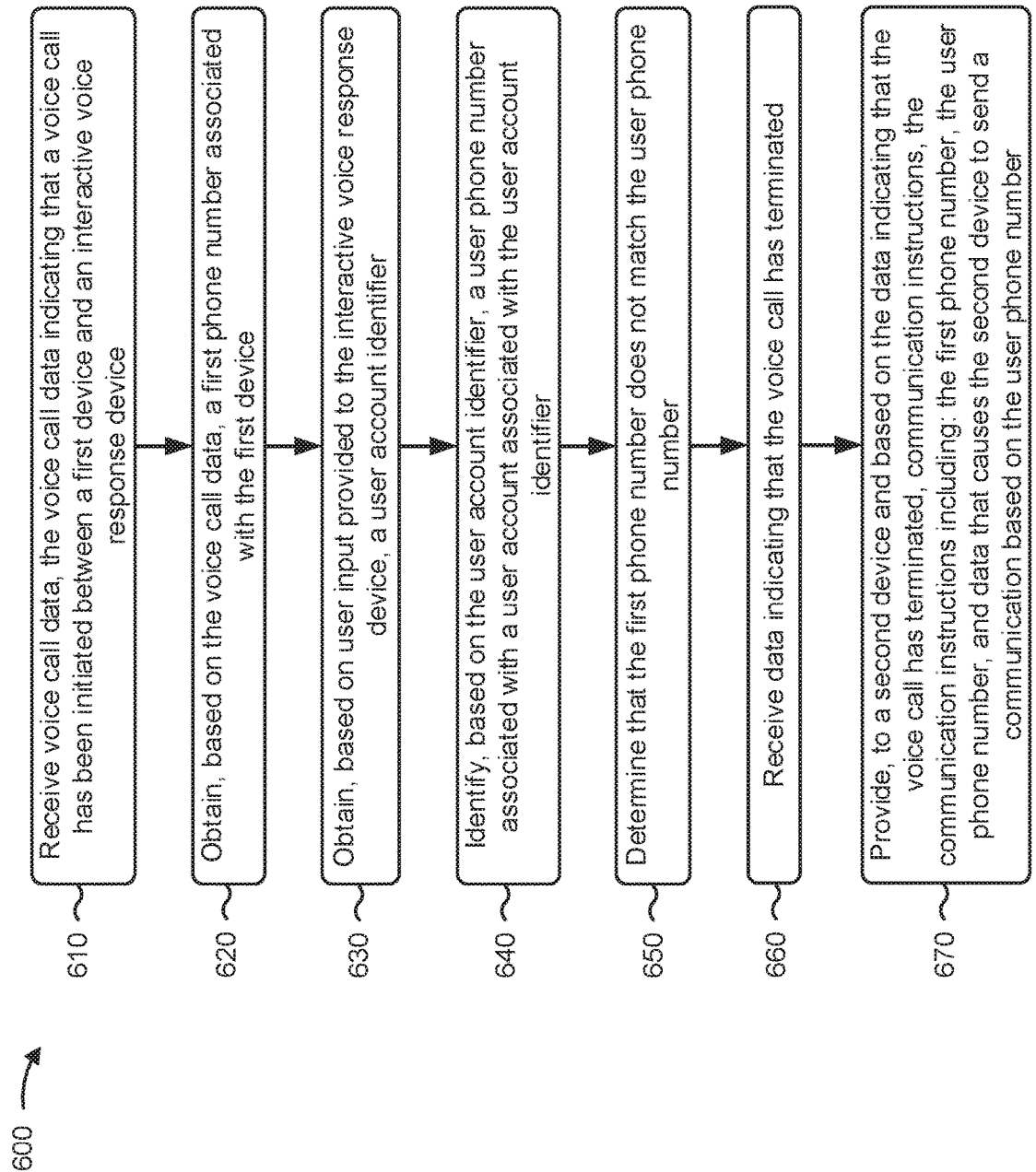

CALL DATA MANAGEMENT PLATFORM

RELATED APPLICATION

This application is a continuation of U.S. patent application Ser. No. 16/163,199, filed Oct. 17, 2018, which is incorporated herein by reference.

BACKGROUND

Interactive voice response systems are computing systems that are designed to automatically handle phone calls from users without the need to involve a human operator, or agent, to receive the phone call. Interactive voice response systems typically operate by using a synthesized and/or pre-recorded voice to communicate with a person, and using touch-tone, dual-tone multi-frequency signaling, and/or speech recognition input to handle the phone call.

SUMMARY

According to some implementations, a method, may comprise: receiving, by a computing platform, voice call data, the voice call data indicating that a voice call has been initiated between a first device and an interactive voice response device; obtaining, by the computing platform and based on the voice call data, a user account identifier, the user account identifier identifying a user account; obtaining, by the computing platform and based on the user account identifier, user account data, the user account data including user authentication data; receiving, by the computing platform, user input provided by the first device during the voice call; determining, by the computing platform and based on the user authentication data, that the user input fails to authenticate a user associated with the user account; receiving, by the computing platform, data indicating that the voice call has terminated; identifying, by the computing platform and based on the user input failing to authenticate the user associated with the first device, a second device; and performing, by the computing platform, an action based on the second device and the voice call data.

According to some implementations, a device may comprise: one or more memories; and one or more processors, communicatively coupled to the one or more memories, configured to: receive voice call data, the voice call data indicating that a voice call has been initiated between a first device and an interactive voice response device; obtain, based on the voice call data, a user account identifier, the user account identifier identifying a user account; obtain, based on the user account identifier, user account data, the user account data including user authentication data; receive user input provided by the first device during the voice call; determine, based on the user authentication data, that the user input successfully authenticates a user associated with the user account; receive data indicating that the voice call has terminated; and perform an action based on the user input and the data indicating that the voice call has terminated.

According to some implementations, a non-transitory computer-readable medium may store instructions, the instructions comprising: one or more instructions that, when executed by one or more processors, cause the one or more processors to: receive voice call data, the voice call data indicating that a voice call occurred between a first device and an interactive voice response device; obtain, based on the voice call data, a first phone number associated with the first device; obtain, based on user input provided to the interactive voice response device, a user account identifier; identify, based on the user account identifier, a user phone number associated with a user account associated with the user account identifier; determine that the first phone number does not match the user phone number; receive data indicating that the voice call has terminated; and provide, to a second device and based on the data indicating that the voice call has terminated, communication instructions, the communication instructions including: the first phone number, the user phone number, and data that causes the second device to send a communication based on the user phone number.

BRIEF DESCRIPTION OF THE DRAWINGS

FIGS. 4-6 are flow charts of example processes for call data management.

DETAILED DESCRIPTION

Figure 1A:
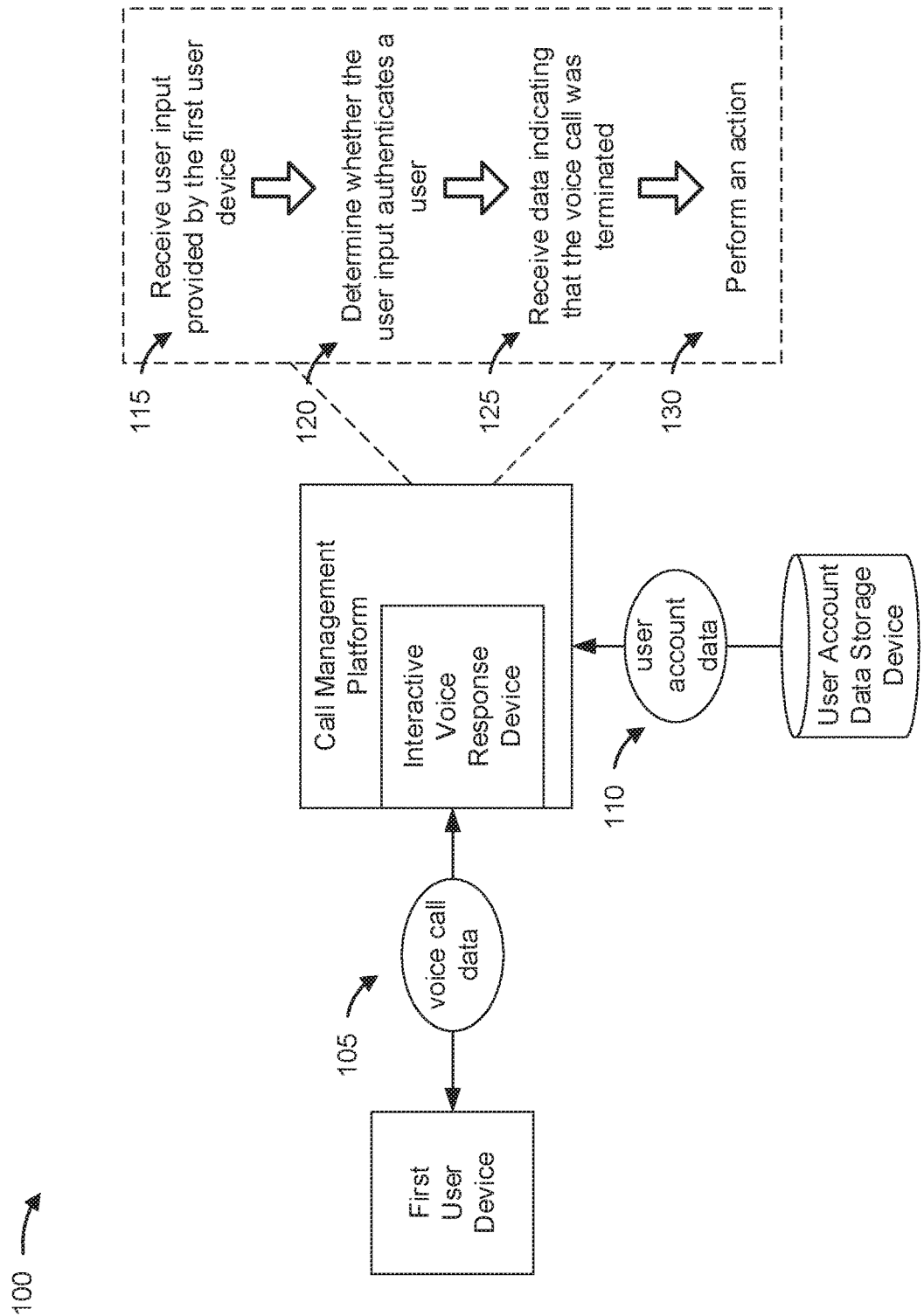
FIGS. 1A-1B are diagrams of example implementations described herein.

The following detailed description of example implementations refers to the accompanying drawings. The same reference numbers in different drawings may identify the same or similar elements.

An interactive voice response (IVR) system is designed to enable an organization to reduce phone costs and potentially improve service by using an automated system to handle voice calls that are directed to the organization. The voice calls handled by an IVR system for an organization are often placed by individuals associated with the organization, such as customers, potential customers, users, employees, and/or the like. An IVR system, while often providing convenience for an organization and the users of the IVR system, is subject to security risks. For example, a malicious user may attempt to call into an organization and use the IVR system to attempt to gain unauthorized access to another user's information, account, and/or the like. An IVR system may be unable to distinguish legitimate attempts to access user account information from malicious attempts, which may enable a malicious user to take advantage of an IVR system to attempt to perpetrate fraud, theft, and/or the like.

Some implementations, described herein, provide a call management platform designed to manage call data that is associated with phone calls that take place with an IVR device. The call management platform manages call data in a manner designed to ensure that potentially fraudulent or otherwise malicious activity may be quickly detected and/or prevented, and in a manner designed to provide better service to legitimate users. For example, the call management platform may receive voice call data associated with a phone call between a user device and an IVR device. The voice call data may include a variety of information regarding the phone call, such as a phone number associated with the user device, user input provided during interaction with the IVR device, and/or the like. The call management platform may facilitate identification of a user account based on user input and/or the voice call data (e.g., by looking up the phone number in a database, asking the user for an account number as input, and/or the like). The call management platform may then facilitate the authentication process used by the IVR device to determine whether the user of the user device is the same as the user associated with the user account identified for the phone call. After authentication, or failure to authenticate, the call management platform determines that the phone call between the user device and the IVR device ended. If authentication failed (or if authentication failed a threshold number of times), the call management platform may take a variety of actions to confirm whether the voice call was legitimate activity or potentially malicious activity and may take further action(s) designed to mitigate any potentially malicious activity. In a situation where authentication was successful, the call management platform may take a variety of actions designed to improve the user experience (e.g., by saving the state of the phone call for the user, communicating with the user regarding the ended phone call, and/or the like).

In this way, the call management platform may manage call data in a manner designed to quickly detect and/or reduce fraud or other malicious activity associated with an IVR device, and in a manner designed to improve the user experience for legitimate users of an IVR device. By using various automated and, in some implementations, machine-learning driven approaches to detecting potentially malicious activity taking place during a phone call with an IVR device, the call management platform may detect malicious activity that might not otherwise be detected, or that might only be detected at a much later point in time. The call management platform may obviate the need to use slower methods of malicious activity detection, and/or methods of malicious activity detection that might use significantly more computing resources to detect. In some implementations, the call management platform may handle thousands, millions, billions, or more data records regarding phone calls with IVR devices within a period of time (e.g., daily, weekly, monthly), concurrently, and/or in real or near real-time, and thus may provide big data capability. The big data handled by the call management platform may be so voluminous and complex that traditional data processing applications cannot be used and/or that the big data cannot be processed objectively by a human actor. Furthermore, some implementations described herein use a rigorous, computerized process to perform tasks or roles that were not previously performed. In addition, automating the process for call management conserves computing resources (e.g., processor resources, memory resources, and/or the like) and time that would otherwise be wasted by using manual processes for attempting to analyze voice call records to determine whether malicious activity has been attempted and/or to deliver fast responses to legitimate callers.

Figure 1B:
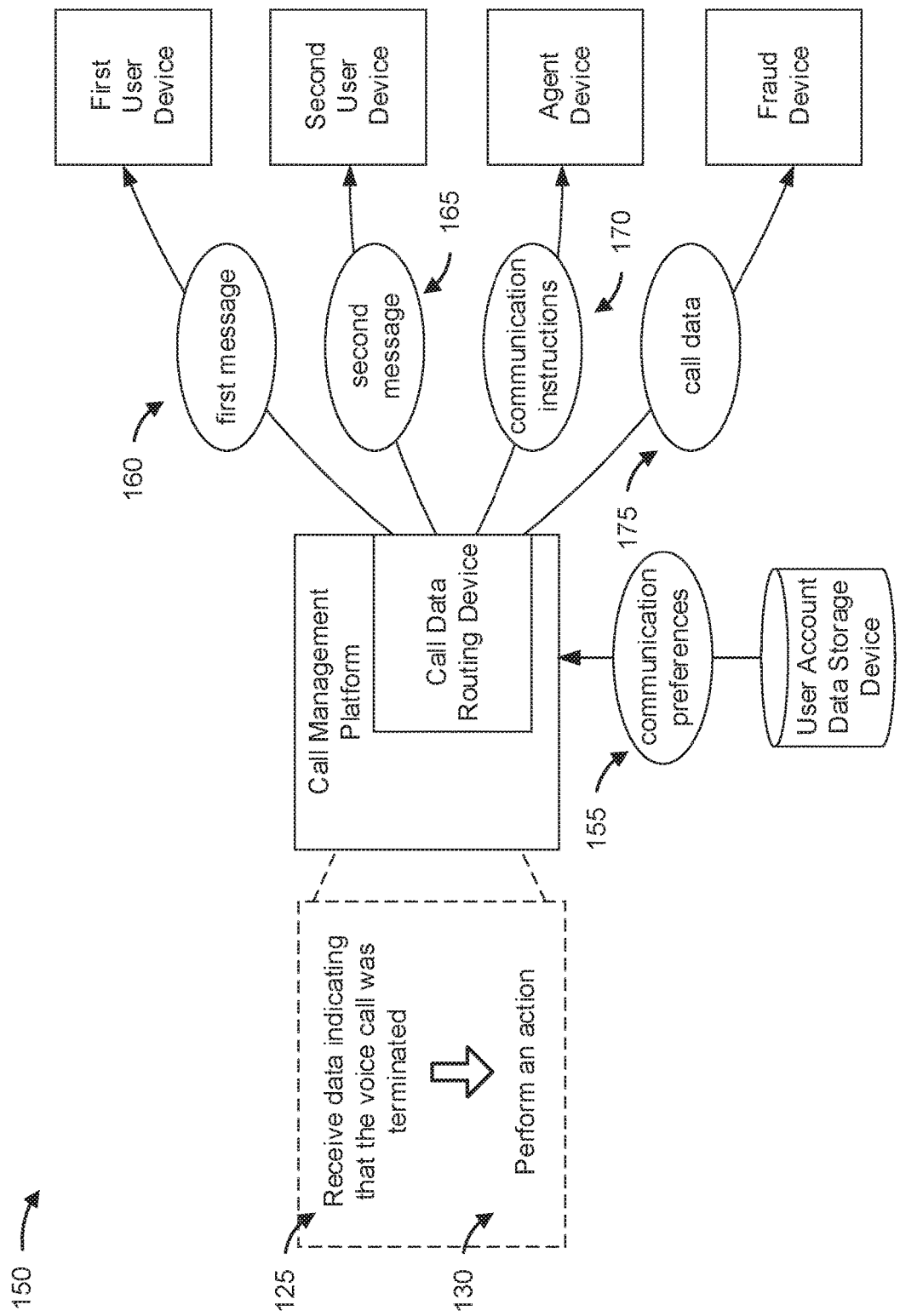

FIGS. 1A-B are diagrams of example implementations described herein. As shown in FIG. 1A, example implementation 100 includes a first user device (e.g., a telephone, a mobile device, a personal computer, and/or the like), a call management platform (e.g., a server computer, a cloud computing platform, and/or the like), an IVR device (e.g., a server computer, a cloud computing resource, and/or the like) included in the call management platform, and a user account data storage device (e.g., one or more hard drives, flash memory devices, and/or the like). While some of the devices of implementation 100 are depicted separately, in some implementations, the functionality of one or more of the separate devices of implementation 100 may be included in another device, or may be included in multiple, distributed devices. Likewise, the functionality of devices depicted as being included in another device (e.g., the IVR device being included in the call management platform) may be included in a separate device or devices. The example implementation 100 depicts a phone call between the first user device and the IVR device, and actions taken by the call management platform based on the content and/or metadata of the phone call.

As shown by reference number 105, a phone call takes place between the first user device and the interactive voice response device, and voice call data is obtained. The voice call data may include a variety of information associated with the phone call between the first user device and the IVR device, including any content of the phone call and/or metadata associated with the phone call. For example, the voice call data may include data identifying a phone number associated with the first user device, a time the call was initiated and/or ended, vocal input provided by a user of the first user device, a transcription of the phone call, other user input provided by the first user device (e.g., touch-tone input, dual-tone multi-frequency signaling, and/or the like), responses provided by the IVR device during the call, various states associated with the phone call (e.g., the logical position of the phone call within a tree of potential IVR responses, the user input provided so far, and/or the like), a recording of the phone call, and/or the like.

In some implementations, the voice call data may be provided to, generated by, or otherwise made accessible to, the call management platform. For example, the IVR device may, at the conclusion of the phone call with the first user device, provide the voice call data to the call management platform. As another example, the call management platform may have direct access to the phone call and be capable of obtaining the voice call data during the phone call (e.g., by having access to the connection between the first user device and IVR device and actively recording the phone call, looking up the phone number associated with the first user device, recording the state of the phone call, and/or the like). The call management platform, by having access to the voice call data, may be enabled to perform a variety of actions designed to assist the IVR device during the call, and to act based on what occurs during the phone call.

As shown by reference number 110, the call management platform obtains user account data from the user account data storage device. The user account data may be obtained, for example, in a manner designed to assist the IVR device during the phone call with the first user device. By way of example, the phone call between the first user device and the IVR device may be associated with a user account (e.g., the user of the first user device may be calling into an organization associated with the IVR device to obtain phone support related to the user account). The user account data may include a variety of information, such as an account identifier, data identifying the user associated with the user account, the user's phone number(s) associated with the user account, the user's electronic mail address associated with the user account, authentication data associated with the user account (e.g., password, passcode, passphrase, biometric authentication data, personally identifying information, dual-factor authentication information, and/or the like), a status of the user account (e.g., payment account balance, collections status, loyalty status, and/or the like), history of the user account (e.g., customer service records, payment records, and/or the like), user preferences regarding the handling of phone calls, and/or the like.

In some implementations, the user account may be identified by the phone number associated with the first user device. For example, the user account data storage device may include a database or other data structure designed to enable the call management platform to look up user account data based on a phone number previously associated with the user account. In this situation, the call management platform may use the phone number included in the voice call data to obtain, from the user account data storage device, user account data for the user account associated with the phone number (e.g., of the first user device).

In some implementations, the user account may be identified based on user input (e.g., included in the voice call data). For example, during the phone call, the IVR device may prompt the user of the first user device to provide input identifying the user account. In this situation, the user of the first user device may provide user input designed to identify the user account (e.g., a phone number associated with the user account, an account number associated with the user account, an address associated with the user account, and/or the like). As noted above, the user account data may be used by the call management platform and/or IVR device to facilitate the service provided to the user during the phone call between the IVR device and the first user device. For example, the user account data may be used, by the IVR device, to authenticate the user of the first user device, to provide service to the user, to provide context to the IVR device when answering questions provided by the user, and/or the like.

As shown by reference number 115, the call management platform receives user input provided by the first user device (e.g., during the phone call with the IVR device and/or after the phone call has ended). In some implementations, the user input may be included in the voice call data. In some implementations, the user input may be provided to the call management platform separately from the voice call data (e.g., sent by the IVR device and/or recorded by the call management platform). The user input may take a variety of forms, such as a voice recording, a transcript of a voice recording (e.g., obtained by providing the voice recording to a transcription device designed to transcribe the phone call), dual-tone multi-frequency signals (e.g., keypad presses on a telephone, mobile phone, and/or the like), and/or the like. The user input may be provided, by the user of the first user device, in response to a prompt by the IVR device. For example, the IVR device may ask for the user's name, and the user input may be a transcription or voice recording of the user's name. As another example, the IVR device may ask for the user's account number (e.g., to identify a user account associated with the user), and the user input may be a string of numbers that the user entered on the keypad of a mobile device as a response to the request for the user's account number.

As shown by reference number 120, the call management platform determines whether the user input authenticates a user associated with the user account. In some implementations, the IVR device may prompt the user of the first user device for user input that can be used to authenticate the user (e.g., to determine whether the user is who the user claims to be and/or whether the user is authorized to access information associated with a particular user account). For example, after identifying the user account (e.g., from the user account data) that the user of the first user device is calling regarding, the IVR device may prompt the user of the first user device for user input that may be used to authenticate the user, such as a password, passphrase, personally identifying information, and/or the like. In response to the prompt, the user of the first user device may provide user input (e.g., in a manner designed to provide authentication).

The call management platform may determine whether the user input authenticates the user of the first user device by comparing the user input to authentication data associated with the user account (e.g., authentication data included in the user account data). In a situation where the user input matches the authentication data (e.g., password given by the user of the first user device matches the password stored in the user account data, personal data provided by the user matches the personal data stored in the user account data, and/or the like), the call management platform may determine that the user is authenticated. In a situation where the user input does not match the authentication data, the call management platform may determine that the user is not authenticated. While the foregoing example involves matching user input with previously stored user account data, other methods of authentication may be used, such as hashing user input to compare the hashed user input to a previously stored hash of the data used for authentication, initiating a two-factor authentication process that communicates with a separate device for authentication, and/or the like.

In a situation where the user is successfully authenticated, the call management platform may provide, to the IVR device, data indicating that the user have been authenticated, enabling further IVR functionality (e.g., further prompts from the IVR device, automated actions enabled by the IVR device, and/or the like). In a situation where the user is not authenticated, the call management platform may provide, to the IVR device, data indicating that the user input failed to authenticate the user. In this situation, the IVR device may prompt the user, an additional time, for user input designed to authenticate the user. This may be performed, for example, in a situation where the IVR device is designed to give a user multiple chances to authenticate (e.g., for situations where a user has forgotten authentication data, incorrectly entered authentication data, provided authentication data via voice that was not properly transcribed, and/or the like). In some implementations, the IVR device may be configured to automatically take action based on a failure to authenticate or based on a threshold number of attempts to authenticate being failed. For example, the IVR device may be configured to end the phone call after a threshold number of failed authentication attempts, route the phone call to a live individual after the threshold number of failed authentication attempts, and/or the like.

In some implementations, the call management platform may store data regarding failed authentication attempts. For example, the call management platform may store (e.g., in the user account data for the user account associated with the attempted authentication) data indicating a number of failed authentication attempts, a number of failed authentication attempts on a particular call, a number of failed authentication attempts over a period of time, and/or the like. In some implementations, the number of failed authentication attempts may also be included in the voice call data (e.g., in a situation where the IVR device conducts the phone call, including handling authentication), which may also be stored by the call management platform (e.g., in the user account data). Information regarding whether the user input resulted in successful or unsuccessful authentication, and the number of failed authentication attempts (if applicable), may be used by the call management platform to determine how to handle call data for the phone call, as described in further detail below.

As shown by reference number 125, the call management platform receives data indicating that the voice call was terminated. For example, the connection between the first user device and the IVR device may be terminated by the first user device and/or the IVR device. The first user device may cause the call to terminate for a variety of reasons and in a variety of ways. For example, the user of the first user device may end the call, the first user device may lose a signal to a wireless network, the first user device may lose power, and/or the like. The IVR device may also cause the call to terminate for a variety of reasons. For example, the IVR device may terminate the call after the phone call appears to be resolved (e.g., as determined by the IVR device), after the IVR device has determined that the IVR device cannot assist the user of the first user device (e.g., as determined by the IVR device), after the IVR device has determined that a predetermined number of failed authentication attempts have been made, and/or the like.

In some implementations, the phone call between the first user device and the IVR device is not terminated. For example, in some situations, the IVR device may transfer or route the phone call to another device, such as an agent device (where a live agent may assist the user of the first user device), another IVR device (e.g., associated with another department or organization), a voicemail device, and/or the like. The phone call may be transferred, for example, in a situation where the IVR device dictates that the phone call should be transferred.

The call management platform determines that the phone call has been terminated in a manner designed to enable the call management platform to take action as a result of the termination of the phone call. For example, in a situation where the phone call is terminated in a manner that might be due to potential fraud or other malicious activity, the call management platform may wish to act in a manner designed to detect and/or prevent the fraud or other malicious activity. In a situation where the phone call is terminated in a manner that might be due to a legitimate user having lost a connection or having been unable to resolve an issue for which the user was calling, the call management platform may wish to act in a manner designed to provide assistance to the user.

As shown by reference number 130, the call management platform performs an action (e.g., based on the phone call being terminated). As noted above, the action taken may depend on a variety of factors, including the manner in which the phone call was terminated, whether the user was authenticated, the state of the phone call when the phone call was terminated, and/or the like. For example, in a situation where the phone call is associated with multiple failed authentication attempts before the call was terminated by the user of the first user device, the call management platform may take one or more actions designed to ensure that the phone call was not an attempt by a malicious user to access the user account. In a situation where the phone call is associated with successful authentication but the call was terminated by the user of the first user device at a state where the IVR device was not likely to have provided a solution (e.g., at a state represented by a node of a conversation tree that does not offer a solution), the call management platform may take one or more actions designed to ensure that the user who called received the service the user was seeking.

In some implementations, the action(s) taken by the call management platform may be based on a configuration of the call management platform. For example, the call management platform may be associated with various thresholds, triggering events, and/or the like, which cause the call management platform to take one or more actions based on whether the thresholds, triggering events, and/or combinations thereof occurred during the phone call. By way of example, the call management platform may be configured to send data identifying the user account and the voice call data to a fraud device (e.g., a device associated with fraud detection and prevention) based on a number of failed authentication attempts meeting a threshold of five failed authentication attempts.

In some implementations, the action(s) taken by the call management platform may be based on user account settings associated with the user account that is associated with the phone call (e.g., the user account associated with the user account data). In this situation, the call management platform may take the action(s) specified by the user account settings (e.g., in a situation where the triggering event(s) specified in the user account settings occurred). For example, a user may have previously indicated that the user wishes to be contacted via an automated text message any time a user device attempts to access the user account, when the user device is not associated with a particular phone number designated by the user. Other forms of contact may also be used to contact the user in the foregoing example, including e-mail, mobile device application notification, a separate phone call, and/or the like, enabling the user to either confirm or deny that the user is attempting to access the account. The call management platform may take further action (e.g., prevent or allow access to the user account by the first user device) based on the user confirmation or denial.

In some implementations, the call management platform may use one or more machine learning techniques to determine which action(s) to take based on the phone call. In some implementations, the call management platform may train a model to determine whether the phone call was likely to be associated with malicious activity. As another example, the call management platform may train a model to categorize a phone call into a particular category, where each category may be associated with one or more actions that should be taken on phone calls that are categorized by the model as belonging to the category.

When using machine learning, a machine learning model may be trained to receive, as input, a variety of features associated with the phone call. A feature may be a measurable property or characteristic that may be used for training a machine learning model, such as a property relating to a particular individual or demographic of individuals, a property relating to a particular device or group of devices, a property associated with aggregating a particular type of information, a property identifying a benchmark for a particular individual or class of individuals, a property capable of being used as a signal of risk for an action, and/or the like. Machine learning features may be determined using a feature identification technique, such as text mining and latent semantic analysis (LSA), a trend variable analysis, an interest diversity analysis, a neural network, a composite indicators analysis, a clustering analysis, and/or the like. Using one or more feature selection techniques, the call management platform may select the features to be used by a machine learning model. The resulting model may receive features (e.g., voice call data) as input and produce, as output, data indicating a measure of likelihood that a particular phone call is likely to be associated with malicious activity. As another example, the resulting model (or a different or additional model), may produce, as output, data indicating an action to be taken (e.g., an action determined to be most likely to resolve a terminated phone call based on the trained model). By way of example, in a situation where the machine learning model determines that a terminated phone call is likely to be malicious (e.g., output from a machine learning model meeting a threshold measure a likelihood that the phone call is malicious), the model may determine that a particular action should be taken from multiple actions, such as sending a text message to the user phone number associated with the user account, enabling the user associated with the user account to respond with a message that indicates whether the terminated phone call was legitimate or potentially malicious.

Some example features used to train the model may include whether user authentication was successful, a number of failed authentication attempts, whether the user device used on the call is associated with a phone number associated with the user account attempting to be accessed, whether the phone number associated with the user device used on the call is associated with known malicious activity, whether the user account was identified based on user input, the state of the IVR process (e.g., state of the transcript, response tree, and/or the like), whether the call was terminated just before the call was to be forwarded to a live agent, the user input that was provided by the user device on the call, whether the user account has been previously targeted by a malicious actor, and/or the like. Each of the foregoing, if available to the call management platform, may be used as a feature for input to a machine learning model.

Using the foregoing features, the call management platform may train a model to provide, as output, data indicating a measure of likelihood that the phone call is likely to be malicious (e.g., output from a machine learning model meeting a threshold measure a likelihood that the phone call is malicious). In some implementations, the model may be trained using one or more supervised machine learning techniques. Training data may be obtained from previous applications of the model that are annotated by a user (e.g., a subject matter expert) with data indicating whether the output of the model correctly identified malicious activity being attempted during the phone call.

In some implementations, the call management platform may train the model using one or more subsets of features (e.g., features identified and selected based on feature identification and selection techniques described above). Additionally, the call management platform may train the model using a supervised training technique, an unsupervised training technique, a classification-based training technique, a logistical regression-based training technique, a Naïve Bayesian classifier technique, a support vector machine (SVM) training technique, a neural network, and/or the like. As noted above, in some implementations, the model may be trained to output a value indicating a measure of confidence that a phone call is associated with malicious activity. In some implementations, the model may be trained to output one or more actions that should be taken based on the characteristics (e.g., features) of a phone call.

In some implementations, the call management platform may receive the model after the model has been trained. For example, a device other than the call management platform may train the model and may provide the model to the call management platform. In some cases, the device other than the call management platform may train a portion of the model, and the call management platform may train the remainder of the model.

In some implementations, the call management platform may receive data (e.g., voice call data) that may be provided to a trained machine learning model in real time or near real time (e.g., while the phone call is taking place). In this situation, the call management platform may periodically obtain output from the machine learning model, e.g., in a manner designed to enable quick identification of a potentially malicious phone call. For example, in a situation where a machine learning model produces a measure of likelihood that the phone call is potentially malicious, the call management platform may determine, during a phone call and after the output of the machine learning model meets a threshold measure of likelihood that the phone call is malicious, to take one or more actions during the phone call. For example, the call management platform may determine to end the phone call, contact a fraud device, contact another user device associated with the user account, and/or the like.

In this way, the call management platform may use a variety of techniques to determine which action(s) to take based on the termination of a phone call. Machine learning, platform configuration, user account settings, and/or the like, may be used to facilitate making the determination of which action(s) should be performed by the call management platform. The action(s) taken by the call management platform, described in further detail below with reference to FIG. 1B, may be designed to detect and prevent malicious activity, remedy potential security risks, and improve user experience in near-real time.

As shown in FIG. 1B, example implementation 150 includes a call management platform (e.g., the same as or similar to the call management platform described above with reference to FIG. 1A), a call data routing device (e.g., server computer, cloud computing resource, and/or the like), a first user device (e.g., the same as or similar to the first user device described above with reference to FIG. 1A), a second user device (e.g., a telephone, a mobile device, a personal computer, and/or the like), an agent device (e.g., a telephone, a mobile device, a personal computer, and/or the like), and a fraud device (e.g., a personal computer, server computer, and/or the like). While some of the devices of implementation 150 are depicted separately, in some implementations, the functionality of one or more of the separate devices of implementation 150 may be included in another device, or may be included in multiple, distributed devices. Likewise, the functionality of devices depicted as being included in another device (e.g., the call data routing device being included in the call management platform) may be included in a separate device or devices. The example implementation 150 depicts potential actions taken by the call management platform based on termination of a voice call between the first user device and the IVR device (e.g., as described above with reference to FIG. 1A).

As shown by reference number 155, the call management platform may obtain communication preferences from the user account data storage device. In some implementations, a user account may be associated with communication preferences (e.g., settings previously configured by the user associated with the user account). The communication preferences may cause the call management platform to take one or more actions based on the phone call (e.g., in addition to or alternatively to one or more actions that might otherwise be performed by the call management platform). For example, communication preferences may indicate that, for any attempt to access the user account, the user should be notified. As another example, the communication preferences may indicate that the user should be notified only if a failed attempt to access the user account occurred. As yet another example, the communication preferences may indicate the user should only be notified if the call management platform determines that malicious activity is likely to have occurred (or been attempted) during the phone call. In some implementations, communication preferences may also indicate one or more methods of communication for communicating with the user. For example, the communication preferences may indicate that the user should be sent an e-mail for regular user account access, a text message for a failed authentication attempt, and a phone call if malicious activity is likely to have occurred. When using communication preferences, the action(s) performed by the call management platform may include any action(s) included in the communication preferences, such as contacting one or more devices based on a variety of triggering events, and contacting the devices using a variety of methods of communication.

As shown by reference number 160, the call management platform (e.g., using the call data routing device) may provide a first message to the first user device. In some implementations, the call management platform may send a message (e.g., the first message) to the first user device (e.g., the device that participated in the terminated phone call). For example, in a situation where the first user device was successfully authenticated, but the call terminated at a state where the IVR device had not offered a resolution for the user, the call management platform may send the first user device (and/or another device specified by the communication preferences) a text message (and/or a phone call, electronic mail, and/or the like) asking if the user's call reached a successful resolution.

In some implementations, the call management platform may use state information associated with the terminated phone call to supplement the first message. For example, in a situation where the user reached a state of the phone call where particular user information was requested and the user terminated the call before the user provided the particular user information, the call management platform may include, in the first message, a reminder to provide the particular user information and a phone number to call when the user has the particular user information available. In some implementations, the call management platform may use the state information associated with the terminated phone call to schedule a follow-up call or message with the user associated with the user account. For example, in a situation where the user reached a particular state during the call with the IVR device, but the call was terminated, the state of the call prior to termination may be saved, and the call management platform may include, in the first message, data indicating a time at which the user may call back and continue the call with the IVR (or a live agent) from the particular state the call was left in. Using state information to may conserve computing resources that would otherwise be used to start over form the beginning of a phone call with an IVR device (or live agent).

As another example, the call management platform may send the first message to the first user device in a situation where the first user device is associated with a user account with a special status (e.g., user account requiring updated user account information, user account in collections, and/or the like). In this situation, the organization that manages the user accounts may wish to contact the user associated with the user account (e.g., in an attempt to contact the user regarding updated account information, collections, and/or the like), but has been unable to do so. By contacting the first user device with the first message after the user associated with the first user device terminated the phone call, the call management platform may increase the likelihood that the user associated with the user account is available to be contacted (e.g., regarding updated user account information, collections, and/or the like).

In some implementations, the call management platform may contact the first user device in a situation where user authentication failed during the call between the IVR device and the first user device. For example, the call management platform may include, in the first message, information indicating that additional authentication (e.g., biometric authentication, live agent authentication, two-factor authentication, and/or the like) would be required before the first user device could be used to access the user account data.

As shown by reference number 165, the call management platform (e.g., using the call data routing device) may provide a second message to the second user device. The second user device may be a device identified by settings included in the user account associated with the phone call (e.g., in communication preferences and/or user account data). The second user device may be, for example, a user device associated with the user account (e.g., the main user account device, a device configured for two-factor authentication, or another device associated with the user associated with the user account or another user) and identified, for example, by a phone number, e-mail address, IP address, MAC address, and/or the like. The second message may include anything described above as being included in the first message, such as information regarding the terminated phone call, two-factor authentication data, and/or the like.

Additionally, or alternatively, the second message may include information identifying the first user device (e.g., a phone number, a portion or all of the voice call data, and/or the like) and/or information regarding the call manager's assessment of the terminated phone call. For example, the second message may include a text message sent to the primary phone number associated with the user account associated with the terminated phone call. The text message may indicate, for example, that the first user device (e.g., identified by the phone number of the first user device) attempted to access the user account associated with the primary phone number, but was denied for authentication failure(s). As another example, the second message may include a call-back number designed to enable the user of the second user device to call and confirm whether the terminated phone call was legitimate or potentially malicious.

As shown by reference number 170, the call management platform (e.g., using the call data routing device) may provide communication instructions to the agent device. The agent device may include a computing device operated by a live agent capable of providing live support associated with the user account associated with the terminated phone call. In some implementations, the agent device may be an automated device designed to provide support (e.g., another IVR device, a virtual assistant, and/or the like). The communication instructions may include a variety of information designed to cause the agent device and/or the agent associated with the agent device, to take one or more actions. For example, any of the actions described as being performed by the call management platform (e.g., sending the first message to the first user device, sending the second message to the second user device, and/or the like) may also be performed by the agent device (e.g., based on the communication instructions). For example, after the termination of the phone call, the call management platform may provide communication instructions to the agent device. The communication instructions may include at least a portion of the voice call data, including data identifying the first user device and/or data identifying the second user device. The communication instructions may cause an agent associated with the agent device to call the second user device to provide the user associated with the user account with the second message. For example, the communication instructions may be placed into an agent calling queue, enabling the communication instructions to be provided to the next available live agent to perform the action(s) specified by the communication instructions.

As shown by reference number 175, the call management platform (e.g., using the call data routing device) may provide call data to the fraud device. The fraud device may be a device associated with a fraud department, a government organization (e.g., law enforcement), and/or the like. The call data provided to the fraud device may include a variety of information associated with the terminated phone call. For example, the call data may include data identifying the first user device (e.g., the phone number of the first user device) and at least a portion of the voice call data (e.g., a transcript of the call, recording of the call, and/or the like). By providing the fraud device with call data, the call management platform may enable further action to be taken in a manner designed to prevent fraud or other malicious activity from occurring, or in a manner designed to facilitate apprehension of malicious actors.

In some implementations, the call management platform may take action associated with the user account associated with the terminated phone call. For example, the call management platform may freeze or lock an account based on the terminated phone call being identified as likely to be malicious (e.g., output from a machine learning model meeting a threshold measure a likelihood that the phone call is malicious). As another example, the call management platform may suspend the user account and issue new account information to the legitimate user associated with the account. For example, in a situation where the terminated phone call was an attempt to access bank funds using a bank card, the call management platform may suspend the bank card and cause a new bank card (e.g., with a new account identifier) to be issued to the legitimate user.

In some implementations, the call management platform may log any information related to the terminated phone call and/or the action(s) taken by the call management platform. For example, the voice call data, data identifying the first user device and second user device, the first message, second message, communication instructions, call data, and/or the like, may all be logged in a data storage device. Logging the data associated with the terminated phone call, and the action(s) taken, may facilitate training and/or retraining a machine learning model, such as the model described above as being used to facilitate determining the appropriate action(s) to take based on the manner in which the voice call was terminated.

As noted above, the action(s) taken by the call management platform may be based on user settings, call management platform configuration data, machine learning model output, and/or the like. Any action being described as being performed by the call management platform, call data routing device, first user device, second user device, agent device, and/or fraud device, may be performed, in some implementations, by one or more of the other devices depicted in implementation 150.

In this way, the call management platform may manage call data in a manner designed to quickly detect and/or reduce fraud or other malicious activity associated with an IVR device, and in a manner designed to improve the user experience for legitimate users of the IVR device. By using various automated and, in some implementations, machine-learning driven approaches to detect potentially malicious activity taking place during a phone call with an IVR device, the call management platform may detect malicious activity that might not otherwise be detected, or that might only be detected at a much later point in time. The call management platform may obviate the need to use slower methods of malicious activity detection, and/or methods of malicious activity detection that might use significantly more computing resources to detect. In some implementations, the call management platform may handle thousands, millions, billions, or more data records regarding phone calls with IVR devices within a period of time (e.g., daily, weekly, monthly), concurrently, and/or in real or near real-time, and thus may provide big data capability. The big data handled by the call management platform may be so voluminous and complex that traditional data processing applications cannot be used and/or that the big data cannot be processed objectively by a human actor. Furthermore, some implementations described herein use a rigorous, computerized process to perform tasks or roles that were not previously performed. In addition, automating the process for call management conserves computing resources (e.g., processor resources, memory resources, and/or the like) and time that would otherwise be wasted by using manual processes for attempting to analyze voice call records to determine whether malicious activity has been attempted and/or to deliver fast responses to legitimate callers.

As indicated above, FIGS. 1A-B are provided merely as examples. Other examples are possible and may differ from what was described with regard to FIGS. 1A-B.

Figure 2:
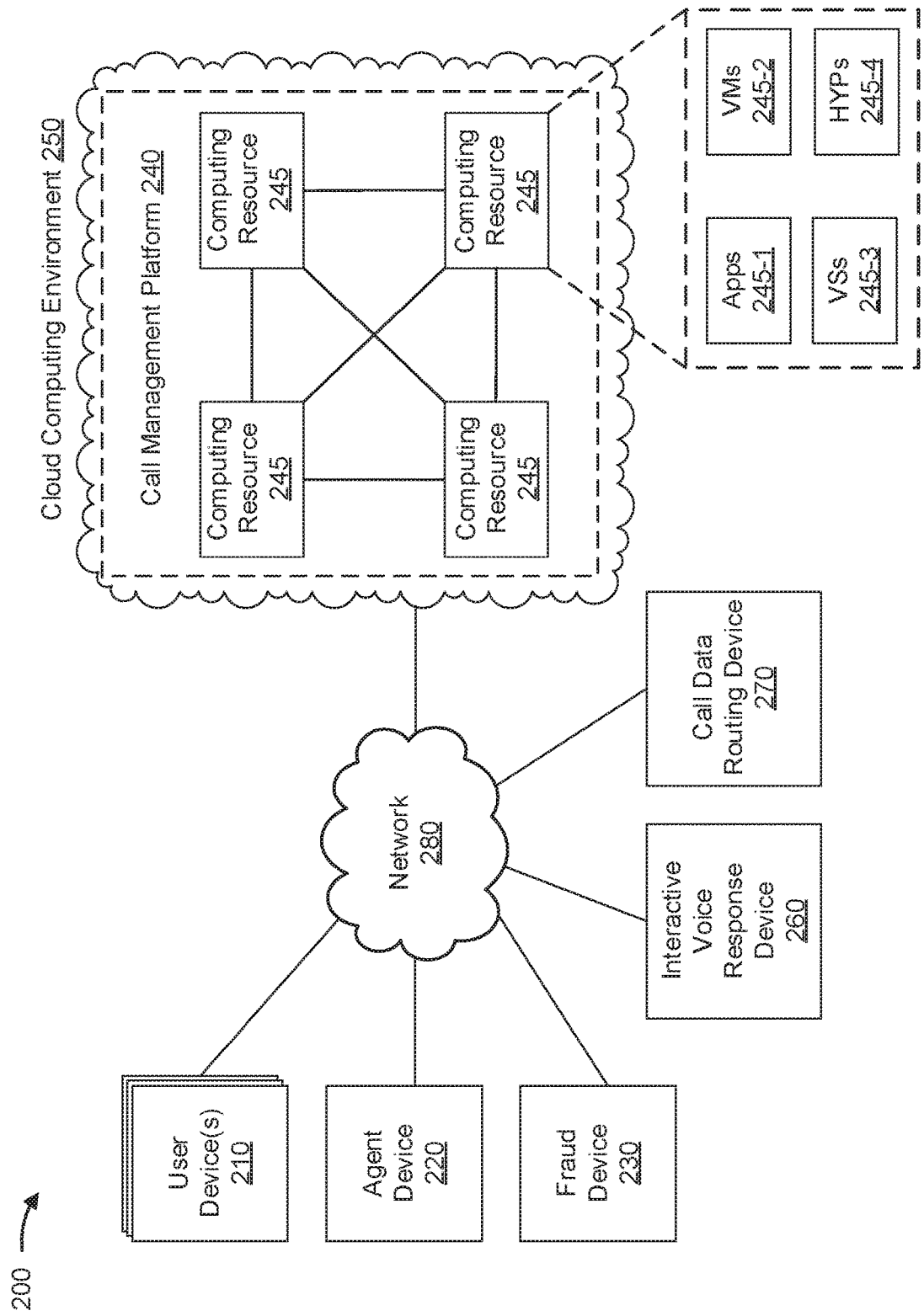
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user device(s) 210, an agent device 220, a fraud device 230, a call management platform 240, a computing resource 245, a cloud computing environment 250, an interactive voice response (IVR) device 260, a call data routing device 270, and a network 280. Devices of environment 200 may interconnect via wired connections, wireless connections, or a combination of wired and wireless connections.

User device 210 includes one or more devices capable of receiving, generating, storing, processing, and/or providing information associated with phone calls, text messages, electronic mail messages, and/or the like. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may be capable of communicating with other devices, over network 280, including, for example, communicating via a telephone call, cellular call, voice over IP call, and/or the like.

Agent device 220 includes one or more devices capable of receiving, generating, storing, processing, and/or providing information associated with phone calls, text messages, electronic mail messages, user account data, and/or the like. For example, agent device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server computer, or a similar type of device. Agent device 220 may be capable of communicating with other devices, over network 280, including, for example, receiving communication instructions from call management platform 240 and communicating with user device 210 and/or fraud device 230. In some implementations, agent device 220 may be operated by a live agent while, in some implementations, agent device 220 may include logic for automating tasks that would otherwise be performed by a live agent (e.g., contacting user device 210).

Fraud device 230 includes one or more devices capable of receiving, generating, storing, processing, and/or providing information associated with phone calls, text messages, electronic mail messages, user account data, and/or the like. For example, fraud device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server computer, or a similar type of device. Fraud device 230 may be capable of communicating with other devices, over network 280, including, for example, receiving call data from agent device 220, call management platform 240, and/or the like.

Call management platform 240 includes one or more devices capable of receiving, generating, storing, processing, and/or providing information associated with phone calls associated with user accounts, IVR devices, and/or the like. For example, call management platform 240 may include a server device (e.g., a host server, a web server, an application server, etc.), a data center device, or a similar device. For example, call management platform 240 may be analyzing voice call data associated with a user account to determine whether the phone call associated with the user account was potentially malicious, and to perform one or more actions based on the manner in which the phone call ended.

In some implementations, as shown, call management platform 240 may be hosted in cloud computing environment 250. Notably, while implementations described herein describe call management platform 240 as being hosted in cloud computing environment 250, in some implementations, call management platform 240 might not be cloud-based (i.e., may be implemented outside of a cloud computing environment 250) or might be partially cloud-based.

Cloud computing environment 250 includes an environment that delivers computing as a service, whereby shared resources, services, etc. may be provided to call management platform 240, user device 210, agent device 220, fraud device 230, IVR device 260, call data routing device 270, and/or the like. Cloud computing environment 250 may provide computation, software, data access, storage, and/or other services that do not require end-user knowledge of a physical location and configuration of a system and/or a device that delivers the services. As shown, cloud computing environment 250 may include call management platform 240 and computing resource 245.

Computing resource 245 includes one or more personal computers, workstation computers, server devices, or another type of computation and/or communication device. In some implementations, computing resource 245 may host call management platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by user device 210. Application 245-1 may eliminate a need to install and execute the software applications on user device 210, agent device 220, fraud device 230, call management platform 240, IVR device 260, call data routing device 270, and/or the like. For example, application 245-1 may include software associated with call management platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., user device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Interactive voice response device 260 includes one or more devices capable of receiving, generating, storing, processing, and/or providing information associated with phone calls, user account data, and/or the like. For example, interactive voice response device 260 may include a personal computer, server device (e.g., a host server, a web server, an application server, etc.), a data center device, or a similar device. For example, interactive voice response device 260 may be designed to handle phone calls using an interactive voice response system and logic designed to enable a user calling interactive voice response device 260 to access information designed to obviate the need to talk to a live agent for assistance with various tasks associated with a variety of different types of organizations.

Call data routing device 270 includes one or more devices capable of receiving, generating, storing, processing, and/or providing information associated with phone calls, messages, and/or the like. For example, call data routing device 270 may include a personal computer, server device (e.g., a host server, a web server, an application server, etc.), a data center device, or a similar device. For example, call data routing device 270 may be capable of routing voice call data, phone calls, text messages, and/or the like, to other devices, such as user device 210, agent device 220, fraud device 230, and/or the like.

Network 280 includes one or more wired and/or wireless networks. For example, network 280 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional device2s and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
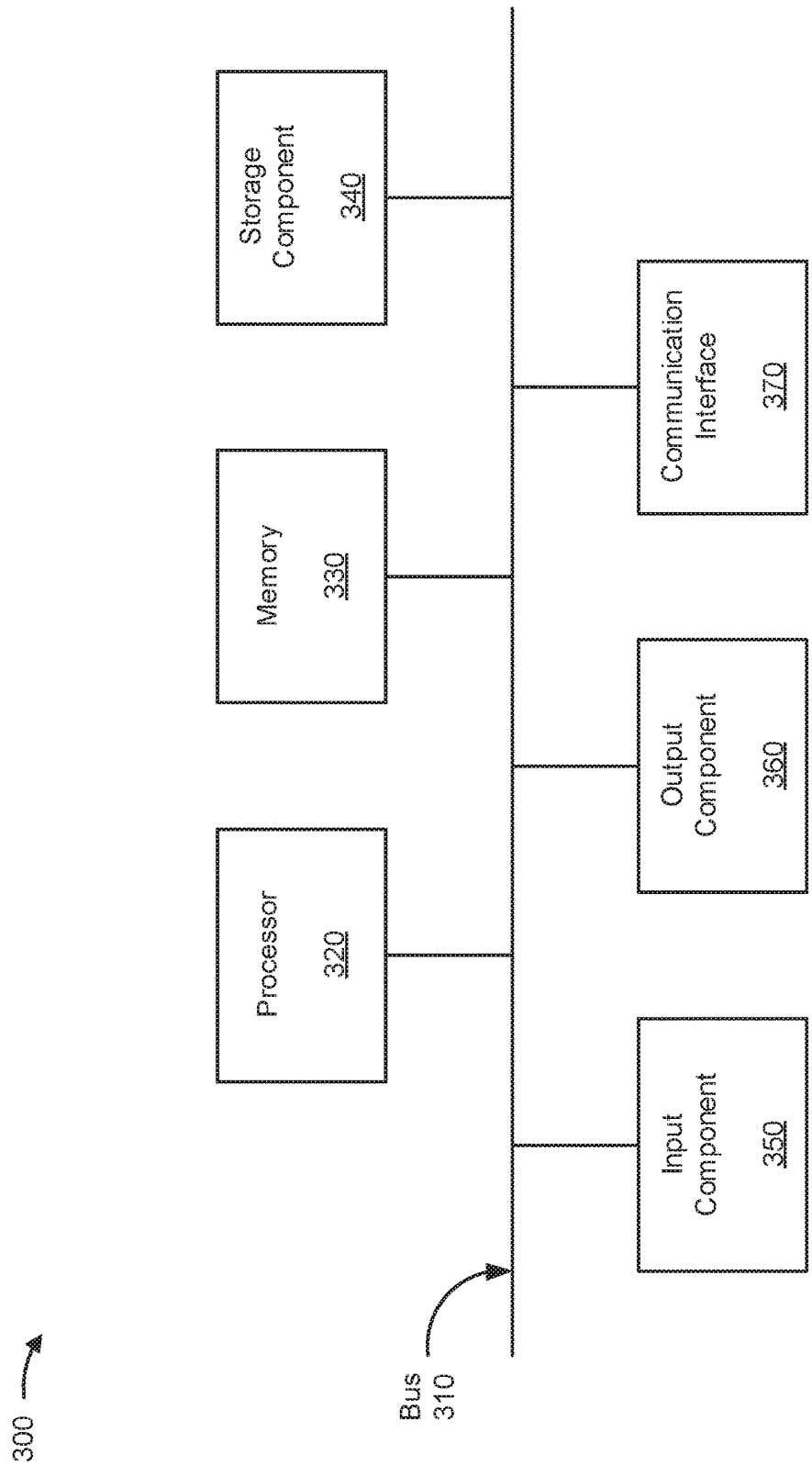
FIG. 3 is a diagram of example components of one or more devices of FIG. 2.

FIG. 3 is a diagram of example components of a device 300. Device 300 may correspond to user device 210, agent device 220, fraud device 230, call management platform 240, computing resource 245, interactive voice response device 260, and/or call data routing device 270. In some implementations, user device 210, agent device 220, fraud device 230, call management platform 240, computing resource 245, interactive voice response device 260, and/or call data routing device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
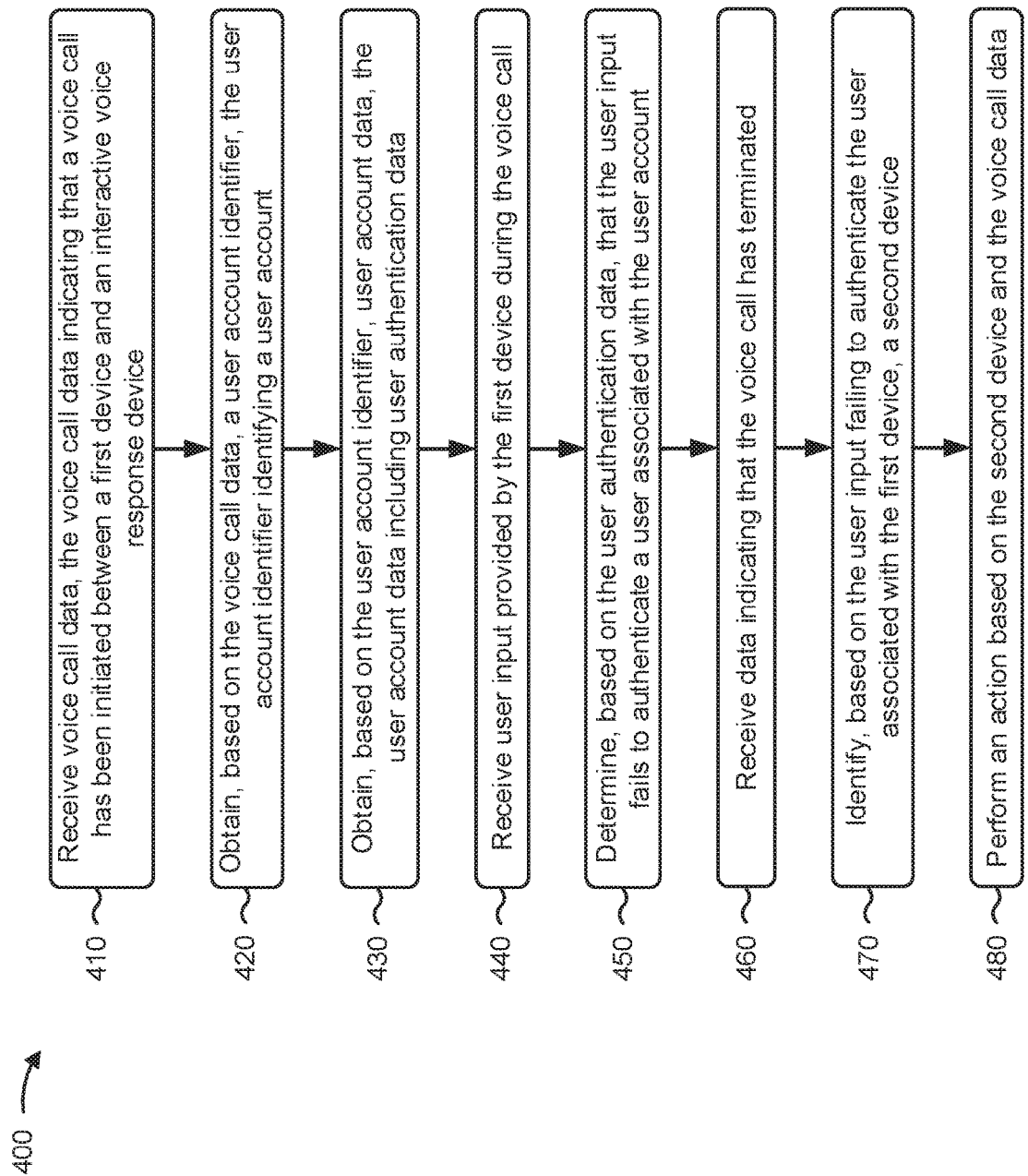

FIG. 4 is a flow chart of an example process 400 for call data management. In some implementations, one or more process blocks of FIG. 4 may be performed by a call management platform (e.g., call management platform 240). In some implementations, one or more process blocks of FIG. 4 may be performed by another device or a group of devices separate from or including call management platform (e.g., call management platform 240), such as a user device (e.g., user device 210), an agent device (e.g., agent device 220), a fraud device (e.g., fraud device 230), a computing resource (e.g., computing resource 245), an interactive voice response device (e.g., interactive voice response device 260), and/or a call data routing device (e.g., call data routing device 270).

As shown in FIG. 4, process 400 may include receiving voice call data, the voice call data indicating that a voice call has been initiated between a first device and an interactive voice response device (block 410). For example, the call data management platform (e.g., using computing resource 245, processor 320, memory 330, storage component 340, input component 350, communications interface 370, and/or the like) may receive voice call data, the voice call data indicating that a voice call has been initiated between a first device and an interactive voice response device, as described above in connection with FIGS. 1A-1B.

As further shown in FIG. 4, process 400 may include obtaining, based on the voice call data, a user account identifier, the user account identifier identifying a user account (block 420). For example, the call data management platform (e.g., using computing resource 245, processor 320, memory 330, storage component 340, input component 350, communications interface 370, and/or the like) may obtain, based on the voice call data, a user account identifier, the user account identifier identifying a user account, as described above in connection with FIGS. 1A-1B.

As further shown in FIG. 4, process 400 may include obtaining, based on the user account identifier, user account data, the user account data including user authentication data (block 430). For example, the call data management platform (e.g., using computing resource 245, processor 320, memory 330, storage component 340, input component 350, communications interface 370, and/or the like) may obtain, based on the user account identifier, user account data, the user account data including user authentication data, as described above in connection with FIGS. 1A-1B.

As further shown in FIG. 4, process 400 may include receiving user input provided by the first device during the voice call (block 440). For example, the call data management platform (e.g., using computing resource 245, processor 320, memory 330, storage component 340, input component 350, communications interface 370, and/or the like) may receive user input provided by the first device during the voice call, as described above in connection with FIGS. 1A-1B.

As further shown in FIG. 4, process 400 may include determining, based on the user authentication data, that the user input fails to authenticate a user associated with the user account (block 450). For example, the call data management platform (e.g., using computing resource 245, processor 320, memory 330, storage component 340, input component 350, output component 360, communications interface 370, and/or the like) may determine, based on the user authentication data, that the user input fails to authenticate a user associated with the user account, as described above in connection with FIGS. 1A-1B.

As further shown in FIG. 4, process 400 may include receiving data indicating that the voice call has terminated (block 460). For example, the call data management platform (e.g., using computing resource 245, processor 320, memory 330, storage component 340, input component 350, communications interface 370, and/or the like) may receive data indicating that the voice call has terminated, as described above in connection with FIGS. 1A-1B.

As further shown in FIG. 4, process 400 may include identifying, based on the user input failing to authenticate the user associated with the first device, a second device (block 470). For example, the call data management platform (e.g., using computing resource 245, processor 320, memory 330, storage component 340, input component 350, output component 360, communications interface 370, and/or the like) may identify, based on the user input failing to authenticate the user associated with the first device, a second device, as described above in connection with FIGS. 1A-1B.

As further shown in FIG. 4, process 400 may include performing an action based on the second device and the voice call data (block 480). For example, the call data management platform (e.g., using computing resource 245, processor 320, memory 330, storage component 340, input component 350, communications interface 370, and/or the like) may perform an action based on the second device and the voice call data, as described above in connection with FIGS. 1A-1B.

Process 400 may include additional implementations, such as any single implementation or any combination of implementations described below and/or in connection with one or more other processes described elsewhere herein.

In some implementations, performing the action based on the second device and the voice call data may include: providing, by the computing platform and to the second device, user call data, the user call data including: instructions to perform, by the second device, an authentication action, and at least a portion of the voice call data.

In some implementations, performing the action based on the second device and the voice call data may include: generating a security alert based on the data indicating that the voice call has terminated, the security alert including at least a portion of the voice call data; and providing, to the second device, the security alert.

In some implementations, the second device may include an agent device associated with an agent. In some implementations, the authentication action may include a phone call to a user phone number associated with the user account data. In some implementations, the authentication action may include sending a text-based message to a user phone number associated with the user account data. In some implementations, the authentication action may include sending an electronic mail message to a user electronic mail address associated with the user account data.

In some implementations, the voice call data may include at least one of: a first phone number associated with the first device, audio data received from the first device, a transcript of the voice call between the first device and the interactive voice response device, or data indicating user inputs provided by the first device during the voice call.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
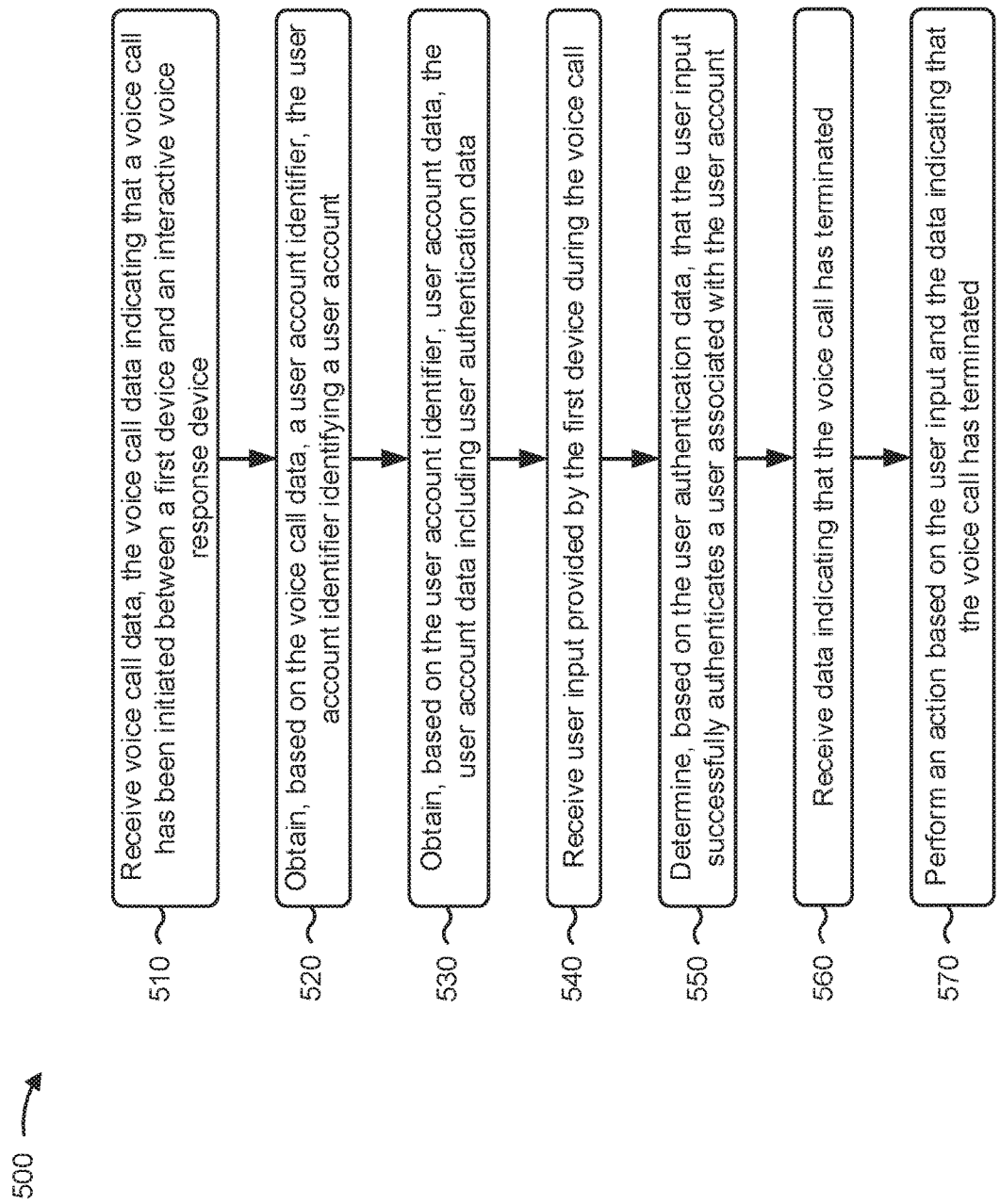

FIG. 5 is a flow chart of an example process 500 for call data management. In some implementations, one or more process blocks of FIG. 5 may be performed by a call management platform (e.g., call management platform 240). In some implementations, one or more process blocks of FIG. 5 may be performed by another device or a group of devices separate from or including call management platform (e.g., call management platform 240), such as a user device (e.g., user device 210), an agent device (e.g., agent device 220), a fraud device (e.g., fraud device 230), a computing resource (e.g., computing resource 245), an interactive voice response device (e.g., interactive voice response device 260), and/or a call data routing device (e.g., call data routing device 270).

As shown in FIG. 5, process 500 may include receiving voice call data, the voice call data indicating that a voice call has been initiated between a first device and an interactive voice response device (block 510). For example, the call data management platform (e.g., using computing resource 245, processor 320, memory 330, storage component 340, input component 350, communications interface 370, and/or the like) may receive voice call data, the voice call data indicating that a voice call has been initiated between a first device and an interactive voice response device, as described above in connection with FIGS. 1A-1B.

As further shown in FIG. 5, process 500 may include obtaining, based on the voice call data, a user account identifier, the user account identifier identifying a user account (block 520). For example, the call data management platform (e.g., using computing resource 245, processor 320, memory 330, storage component 340, input component 350, communications interface 370, and/or the like) may obtain, based on the voice call data, a user account identifier, the user account identifier identifying a user account, as described above in connection with FIGS. 1A-1B.

As further shown in FIG. 5, process 500 may include obtaining, based on the user account identifier, user account data, the user account data including user authentication data (block 530). For example, the call data management platform (e.g., using computing resource 245, processor 320, memory 330, storage component 340, input component 350, communications interface 370, and/or the like) may obtain, based on the user account identifier, user account data, the user account data including user authentication data, as described above in connection with FIGS. 1A-1B.

As further shown in FIG. 5, process 500 may include receiving user input provided by the first device during the voice call (block 540). For example, the call data management platform (e.g., using computing resource 245, processor 320, memory 330, storage component 340, input component 350, communications interface 370, and/or the like) may receive user input provided by the first device during the voice call, as described above in connection with FIGS. 1A-1B.

As further shown in FIG. 5, process 500 may include determining, based on the user authentication data, that the user input successfully authenticates a user associated with the user account (block 550). For example, the call data management platform (e.g., using computing resource 245, processor 320, memory 330, storage component 340, input component 350, output component 360, communications interface 370, and/or the like) may determine, based on the user authentication data, that the user input successfully authenticates a user associated with the user account, as described above in connection with FIGS. 1A-1B.

As further shown in FIG. 5, process 500 may include receiving data indicating that the voice call has terminated (block 560). For example, the call data management platform (e.g., using computing resource 245, processor 320, memory 330, storage component 340, input component 350, communications interface 370, and/or the like) may receive data indicating that the voice call has terminated, as described above in connection with FIGS. 1A-1B.

As further shown in FIG. 5, process 500 may include performing an action based on the user input and the data indicating that the voice call has terminated (block 570). For example, the call data management platform (e.g., using computing resource 245, processor 320, memory 330, storage component 340, input component 350, output component 360, communications interface 370, and/or the like) may perform an action based on the user input and the data indicating that the voice call has terminated, as described above in connection with FIGS. 1A-1B.

Process 500 may include additional implementations, such as any single implementation or any combination of implementations described below and/or in connection with one or more other processes described elsewhere herein.

In some implementations, performing the action based on the user input and the data indicating that the voice call has terminated may include: determining, based on the user account data, that the user account is associated with collections; obtaining, from the voice call data, a first phone number associated with the first device; and providing, to an agent device, data indicating the first phone number and data indicating that the user account is associated with collections.

In some implementations, performing the action based on the user input and the data indicating that the voice call has terminated may include: determining, based on the user account data, that the user account is not associated with collections; obtaining, from the voice call data, a first phone number associated with the first device; and providing, to an agent device, data indicating the first phone number and data indicating that the user account is associated with customer service.

In some implementations, performing the action based on the user input and the data indicating that the voice call has terminated may include: obtaining, from the voice call data, a first phone number associated with the first device; determining, based on the user input, a first state of the voice call, the first state indicating one of a plurality of call states for the voice call; and providing, to an agent device, data indicating: the first phone number, the user account, and the first state.

In some implementations, performing the action based on the user input and the data indicating that the voice call has terminated may include: obtaining, from the user account data, preferred contact data specifying a method of contacting a user associated with the user account; and providing, to an agent device: instructions that cause the agent device to contact the user based on the preferred contact data, and at least a portion of the voice call data.

In some implementations, the voice call data may include data identifying a first phone number associated with the first device. In some implementations, obtaining the user account identifier may include obtaining the user account identifier from a data structure based on the first phone number.

In some implementations, the voice call data may include data identifying a first phone number associated with the first device, and obtaining the user account identifier may include: determining that the first phone number does not match a user phone number included in user account data; and obtaining, from the first device, second user input identifying the user account identifier.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for call data management. In some implementations, one or more process blocks of FIG. 6 may be performed by a call management platform (e.g., call management platform 240). In some implementations, one or more process blocks of FIG. 6 may be performed by another device or a group of devices separate from or including call management platform (e.g., call management platform 240), such as a user device (e.g., user device 210), an agent device (e.g., agent device 220), a fraud device (e.g., fraud device 230), a computing resource (e.g., computing resource 245), an interactive voice response device (e.g., interactive voice response device 260), and/or a call data routing device (e.g., call data routing device 270).

As shown in FIG. 6, process 600 may include receiving voice call data, the voice call data indicating that a voice call has been initiated between a first device and an interactive voice response device (block 610). For example, the call data management platform (e.g., using computing resource 245, processor 320, memory 330, storage component 340, input component 350, communications interface 370, and/or the like) may receive voice call data, the voice call data indicating that a voice call has been initiated between a first device and an interactive voice response device, as described above in connection with FIGS. 1A-1B.

As further shown in FIG. 6, process 600 may include obtaining, based on the voice call data, a first phone number associated with the first device (block 620). For example, the call data management platform (e.g., using computing resource 245, processor 320, memory 330, storage component 340, input component 350, communications interface 370, and/or the like) may obtain, based on the voice call data, a first phone number associated with the first device, as described above in connection with FIGS. 1A-1B.

As further shown in FIG. 6, process 600 may include obtaining, based on user input provided to the interactive voice response device, a user account identifier (block 630). For example, the call data management platform (e.g., using computing resource 245, processor 320, memory 330, storage component 340, input component 350, communications interface 370, and/or the like) may obtain, based on user input provided to the interactive voice response device, a user account identifier, as described above in connection with FIGS. 1A-1B.

As further shown in FIG. 6, process 600 may include identifying, based on the user account identifier, a user phone number associated with a user account associated with the user account identifier (block 640). For example, the call data management platform (e.g., using computing resource 245, processor 320, memory 330, storage component 340, input component 350, output component 360, communications interface 370, and/or the like) may identify, based on the user account identifier, a user phone number associated with a user account associated with the user account identifier, as described above in connection with FIGS. 1A-1B.

As further shown in FIG. 6, process 600 may include determining that the first phone number does not match the user phone number (block 650). For example, the call data management platform (e.g., using computing resource 245, processor 320, memory 330, storage component 340, and/or the like) may determine that the first phone number does not match the user phone number, as described above in connection with FIGS. 1A-1B.

As further shown in FIG. 6, process 600 may include receiving data indicating that the voice call has terminated (block 660). For example, the call data management platform (e.g., using computing resource 245, processor 320, memory 330, storage component 340, input component 350, communications interface 370, and/or the like) may receive data indicating that the voice call has terminated, as described above in connection with FIGS. 1A-1B.

As further shown in FIG. 6, process 600 may include providing, to a second device and based on the data indicating that the voice call has terminated, communication instructions, the communication instructions including: the first phone number, the user phone number, and data that causes the second device to send a communication based on the user phone number (block 670). For example, the call data management platform (e.g., using computing resource 245, processor 320, memory 330, storage component 340, input component 350, output component 360, communications interface 370, and/or the like) may provide, to a second device and based on the data indicating that the voice call has terminated, communication instructions, the communication instructions including: the first phone number, the user phone number, and data that causes the second device to send a communication based on the user phone number, as described above in connection with FIGS. 1A-1B.

Process 600 may include additional implementations, such as any single implementation or any combination of implementations described below and/or in connection with one or more other processes described elsewhere herein.

In some implementations, process 600 may include obtaining, from user account data associated with the user account identifier, data indicating whether the user account is flagged for security concerns; and providing, to a third device, data indicating the first phone number.

In some implementations, process 600 may include providing the first phone number to a third device; receiving, from the third device, data indicating that the first phone number is flagged for security concerns; and providing, to the second device, the data indicating that the first phone number is flagged for security concerns.

In some implementations, process 600 may include receiving, from a user device associated with the user phone number, data indicating that the voice call may have been fraudulent; and causing the user account to be locked.

In some implementations, process 600 may include providing, to a third device associated with a fraud organization, call data including: the first phone number, and at least a portion of the voice call data. In some implementations, process 600 may include providing, to a third device, data that causes the user account to be assigned a new account number.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Using processes similar to those described above, the call management platform 240 may manage call data in a manner designed to quickly detect and/or reduce fraud or other malicious activity associated with an IVR device, and in a manner designed to improve the user experience for legitimate users of an IVR device. By using various automated and, in some implementations, machine-learning driven approaches to detecting potentially malicious activity taking place during a phone call with an IVR device, the call management platform 240 may detect malicious activity that might not otherwise be detected, or that might only be detected at a much later point in time. The call management platform 240 may obviate the need to use slower methods of malicious activity detection, and/or methods of malicious activity detection that might use significantly more computing resources to detect. In some implementations, the call management platform 240 may handle thousands, millions, billions, and/or the like, of data records regarding phone calls with IVR devices within a period of time (e.g., daily, weekly, monthly), concurrently, and/or in real or near real-time, and thus may provide big data capability. The big data handled by the call management platform 240 may be so voluminous and complex that traditional data processing applications cannot be used and/or that the big data cannot be processed objectively by a human actor. Furthermore, some implementations described herein use a rigorous, computerized process to perform tasks or roles that were not previously performed. In addition, automating the process for call management conserves computing resources (e.g., processor resources, memory resources, and/or the like) and time that would otherwise be wasted by using manual processes for attempting to analyze voice call records to determine whether malicious activity has been attempted and/or to deliver fast responses to legitimate callers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a computing platform, voice call data associated with a voice call between a first device and an interactive voice response device;
obtaining, by the computing platform and based on the voice call data, a user account identifier,
the user account identifier identifying a user account;
obtaining, by the computing platform and based on the user account identifier, user authentication data;
receiving, by the computing platform, user input provided by the first device during the voice call;
determining, by the computing platform and based on the user authentication data, that the user input fails to authenticate a user associated with the user account;
receiving, by the computing platform, data indicating that the voice call has terminated;
determining, by the computing platform, a state of the voice call at a time associated with termination of the voice call,
the state being one of a plurality of call states associated with an interactive voice response process associated with the interactive voice response device;
providing, by the computing platform, to a second device, based on the state of the voice call, and based on the data indicating that the voice call has terminated, communication instructions,
the communication instructions including:
the user account identifier, and
data that causes the second device to send a communication based on the user account identifier; and
providing, by the computing platform and to the second device, user call data, the user call data including:
at least a portion of the voice call data, and
instructions to perform, by the second device, an authentication action,
the authentication action including at least one of:
a phone call to a user phone number associated with the user account,
sending a text-based message to the user phone number associated with the user account, or
sending an electronic mail message to a user electronic mail address associated with the user account.

2. The method of claim 1, wherein:
the second device includes an agent device associated with an agent; and
wherein the instructions to perform the authentication action include:
instructions for the agent device to initiate the phone call to the user phone number associated with the user account.

3. The method of claim 1, wherein:
the second device includes an agent device; and
wherein the instructions to perform the authentication action include:
instructions for the agent device to send the text-based message to the user phone number associated with the user account.

4. The method of claim 1, wherein:
the second device includes an agent device; and
wherein the instructions to perform the authentication action include:
instructions for the agent device to send the electronic mail message to the user electronic mail address associated with the user account.

5. The method of claim 1, further comprising:
generating a security alert based on the data indicating that the voice call has terminated, the security alert including the portion of the voice call data; and providing, to the second device, the security alert.

6. The method of claim 1, wherein the voice call data includes at least one of:
a first phone number associated with the first device,
audio data received from the first device,
a transcript of the voice call between the first device and the interactive voice response device, or
data indicating user inputs provided by the first device during the voice call.

7. The method of claim 1, further comprising:
obtaining, from the voice call data, a first phone number associated with the first device;
determining, based on the user input, a first state of the voice call,
the first state indicating one of the plurality of call states; and
providing, to an agent device, data indicating:
the first phone number,
the user account, and
the first state.

8. A device comprising:
one or more memories; and
one or more processors, communicatively coupled to the one or more memories, configured to:
receive voice call data associated with a voice call between a first device and an interactive voice response device;
obtain, based on the voice call data, a user account identifier,
the user account identifier identifying a user account;
obtain, based on the user account identifier, user authentication data;
receive user input provided by the first device during the voice call;
determine, based on the user authentication data, that the user input successfully authenticates a user associated with the user account;
receive data indicating that the voice call has terminated;
determine a state of the voice call at a time associated with termination of the voice call,
the state being one of a plurality of call states associated with an interactive voice response process associated with the interactive voice response device;
provide, to a second device, based on the user input, the state of the voice call, and the data indicating that the voice call has terminated, communication instructions,
the communication instructions including:
the user account identifier, and
data that causes the second device to send a communication based on the user account identifier; and
provide user call data to the second device, the user call data including:
at least a portion of the voice call data, and
instructions to perform, by the second device, an authentication action,
the authentication action including at least one of:
a phone call to a user phone number associated with the user account,
sending a text-based message to the user phone number associated with the user account, or
sending an electronic mail message to a user electronic mail address associated with the user account.

9. The device of claim 8, wherein the one or more processors are configured to:
determine that the user account is associated with collections;
obtain, from the voice call data, a first phone number associated with the first device; and
provide, to an agent device, data indicating the first phone number and data indicating that the user account is associated with collections.

10. The device of claim 8, wherein the one or more processors are configured to:
determine that the user account is not associated with collections;
obtain, from the voice call data, a first phone number associated with the first device; and
provide, to an agent device, data indicating the first phone number and data indicating that the user account is associated with customer service.

11. The device of claim 8, wherein the one or more processors are configured to:
obtain, from the voice call data, a first phone number associated with the first device;
determine, based on the user input, a first state of the voice call,
the first state indicating one of the plurality of call states; and
provide, to an agent device, data indicating:
the first phone number,
the user account, and
the first state.

12. The device of claim 8, wherein the one or more processors are configured to:
obtain preferred contact data specifying a method of contacting the user; and
wherein the user call data further includes the preferred contact data.

13. The device of claim 8, wherein:
the voice call data includes data identifying a first phone number associated with the first device, and
the one or more processors, when obtaining the user account identifier, are to obtain the user account identifier from a data structure based on the first phone number.

14. The device of claim 8, wherein:
the voice call data includes data identifying a first phone number associated with the first device, and
the one or more processors, when obtaining the user account identifier, are to:
determine that the first phone number does not match the user phone number associated with the user account; and
obtain, from the first device, second user input identifying the user account identifier.

15. A non-transitory computer-readable medium storing instructions, the instructions comprising:
one or more instructions that, when executed by one or more processors, cause the one or more processors to:
receive voice call data associated with a voice call between a first device and an interactive voice response device;
obtain, based on the voice call data, a user account identifier,
the user account identifier identifying a user account;

obtain, based on the user account identifier, user authentication data;
receive user input provided by the first device during the voice call;
determine, based on the user authentication data, that the user input successfully authenticates a user associated with the user account;
receive data indicating that the voice call has terminated;
determine a state of the voice call at a time associated with termination of the voice call,
the state being one of a plurality of call states associated with an interactive voice response process associated with the interactive voice response device;
provide, to a second device, based on the user input, the state of the voice call, and the data indicating that the voice call has terminated, communication instructions,
the communication instructions including:
the user account identifier, and
data that causes the second device to send a communication based on the user account identifier; and
provide user call data to the second device, the user call data including:
at least a portion of the voice call data, and
instructions to perform, by the second device, an authentication action,
the authentication action including at least one of:
a phone call to a user phone number associated with the user account,
sending a text-based message to the user phone number associated with the user account, or
sending an electronic mail message to a user electronic mail address associated with the user account.

16. The non-transitory computer-readable medium of claim 15, wherein the one or more instructions, when executed by the one or more processors, are further to:
generate a security alert based on the data indicating that the voice call has terminated,
the security alert including the portion of the voice call data; and provide, to the second device, the security alert.

17. The non-transitory computer-readable medium of claim 15, wherein the voice call data includes at least one of:
a first phone number associated with the first device,
audio data received from the first device,
a transcript of the voice call between the first device and the interactive voice response device, or
data indicating user inputs provided by the first device during the voice call.

18. The non-transitory computer-readable medium of claim 15, wherein the one or more instructions, when executed by the one or more processors, are further to:
receive, from a user device associated with the user account, data indicating that the voice call may have been fraudulent; and
cause the user account to be locked.

19. The non-transitory computer-readable medium of claim 18, wherein the one or more instructions, when executed by the one or more processors, are further to:
provide, to a third device, data that causes the user account to be assigned a new account number.

20. The non-transitory computer-readable medium of claim 15, wherein the one or more instructions, when executed by the one or more processors, are further to:
obtain, from the voice call data, a first phone number associated with the first device;
determine, based on the user input, a first state of the voice call,
the first state indicating one of the plurality of call states; and
provide, to an agent device, data indicating:
the first phone number,
the user account, and
the first state.

* * * * *